(12) United States Patent
Owens

(10) Patent No.: US 10,630,632 B2
(45) Date of Patent: Apr. 21, 2020

(54) SYSTEMS AND METHODS FOR RANKING COMMENTS

(71) Applicant: Facebook, Inc., Menlo Park, CA (US)

(72) Inventor: Erich James Owens, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 727 days.

(21) Appl. No.: 14/939,827

(22) Filed: Nov. 12, 2015

(65) Prior Publication Data

US 2017/0140036 A1   May 18, 2017

(51) Int. Cl.
   *H04L 12/58* (2006.01)
   *G06N 20/00* (2019.01)

(52) U.S. Cl.
   CPC ............. *H04L 51/32* (2013.01); *G06N 20/00* (2019.01)

(58) Field of Classification Search
   CPC ................................ H04L 51/32; G06N 20/00
   See application file for complete search history.

(56) References Cited

U.S. PATENT DOCUMENTS

| | | | | |
|---|---|---|---|---|
| 2004/0103092 | A1* | 5/2004 | Tuzhilin | G06F 17/30412 |
| 2006/0112068 | A1* | 5/2006 | Zhang | G06F 17/3069 |
| 2012/0278321 | A1* | 11/2012 | Traub | G06F 17/30657 |
| | | | | 707/736 |
| 2013/0073336 | A1* | 3/2013 | Heath | G06Q 30/02 |
| | | | | 705/7.29 |
| 2013/0216203 | A1* | 8/2013 | Nakazawa | H04N 9/79 |
| | | | | 386/241 |
| 2014/0280236 | A1* | 9/2014 | Faller | G06F 17/3053 |
| | | | | 707/749 |
| 2015/0278908 | A1* | 10/2015 | Nice | G06O 30/0631 |
| | | | | 705/26.7 |

* cited by examiner

*Primary Examiner* — Jensen Hu
(74) *Attorney, Agent, or Firm* — Sheppard Mullin Richter & Hampton LLP

(57) ABSTRACT

Systems, methods, and non-transitory computer-readable media can train a model to define relatedness ratings for a plurality of terms. A posted content item and a comment to the posted content item are received. A relevance rating for the comment and the posted content item is determined based on the model. The comment is ranked among a plurality of comments based on the relevance rating.

20 Claims, 9 Drawing Sheets

SYSTEMS AND METHODS FOR RANKING COMMENTS

FIELD OF THE INVENTION

The present technology relates to the field of social networks. More particularly, the present technology relates to computer techniques for ranking comments to a posted content item.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users may be given the ability to comment on or otherwise interact with content items on the social networking system. User comments allow users to interact with the original poster and other users. User experience associated with a social networking system can be enhanced as the social networking system becomes more knowledgeable about the way users interact on the social networking system. When knowledge about user interaction is gained, content and other services can be optimized and offered to the user.

SUMMARY

Various embodiments of the present disclosure can include systems, methods, and non-transitory computer readable media configured to train a model to define relatedness ratings for a plurality of terms, each relatedness rating indicative of a relatedness between two terms. A posted content item and a comment to the posted content item are received. A relevance rating Is determined for the comment and the posted content item based on the model. The comment is ranked among a plurality of comments based on the relevance rating.

In an embodiment, a multi-dimensional space is defined based on the model.

In an embodiment, the posted content item and the comment are mapped in the multi-dimensional space.

In an embodiment, determining a relevance rating for the comment and the posted content item comprises calculating a cosine similarity between the posted content item and the comment in the multi-dimensional space.

In an embodiment, training the model to define relatedness ratings for a plurality of terms comprises analyzing a plurality of pages on a social networking system for related terms.

In an embodiment, ranking the comment among a plurality of comments based on the relevance rating comprises determining whether the relevance rating satisfies a lower relevance rating threshold.

In an embodiment, ranking the comment among a plurality of comments based on the relevance rating comprises determining whether the relevance rating satisfies an upper relevance rating threshold.

In an embodiment, no ranking benefit is conferred by the relevance rating if the relevance rating exceeds the upper relevance rating threshold.

In an embodiment, ranking the comment among a plurality of comments based on the relevance rating comprises crediting an interaction rating based on the relevance rating.

In an embodiment, receiving a posted content item comprises analyzing a non-text posted content item and associating one or more terms with the non-text posted content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
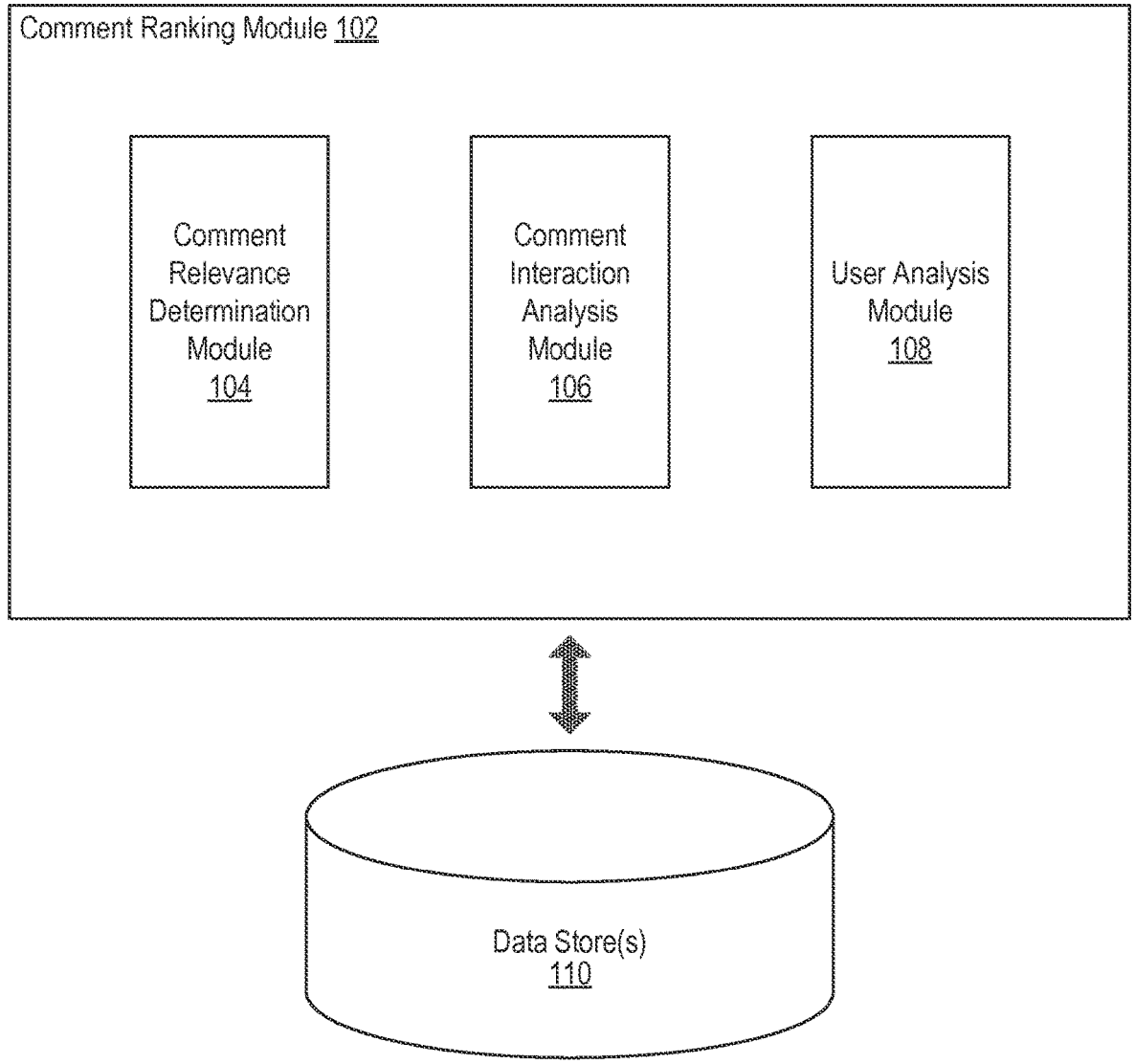
FIG. 1 illustrates an example system including an example comment ranking module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Social Network Post Comment Ranking

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system. Users can interact with content items posted by other users. For example, a user can "like" a content item posted by another user, share the content item, or comment on the content item. Users can also interact with other users' comments. For example, a user can "like" another user's comment or reply to another user's comment.

As users utilize and interact on a social networking system, the system receives and stores more information about user interaction on the social networking system. User interaction information can be used to optimize presentation of content to users, and increase the likelihood that users view content they deem interesting or relevant and are more likely to interact with. For example, interactions on a social networking system can provide information about which comments on a social network post are most interesting to other users. Information regarding such interactions can be leveraged by the social networking system to optimize the presentation of relevant content, advertising, and other services to the user to enhance the user's experience. For example, where there may be thousands of comments to a posted content item, the most relevant or interesting comments may be ranked and prioritized for presentation to other users.

Despite the availability of such information, it continues to be a challenge for social networking systems rooted in computer technology to effectively utilize that information to provide content and services that are of interest to users. For example, in certain scenarios, user comments having a greater level of interaction from other users, such as "likes" and replies, may be assigned a higher ranking because the high levels of user interaction indicate user interest. However, in these scenarios, a phenomenon, sometimes known as the early engagement effect, often results in non-optimal presentation of comments. Earlier comments receiving early interaction may remain highly ranked based solely on the early timing of the comments because subsequent comments will have less opportunity for user interaction. As such, the ranking of early comments may be artificially inflated, while subsequent comments may be pushed down despite the fact that the subsequent comments may be more interesting or relevant.

Therefore, an improved approach can be beneficial for overcoming the foregoing and other disadvantages associated with conventional approaches or improving conventional approaches. Based on computer technology, the disclosed technology can provide social network post comment ranking based on a relevance determination for each comment of a posted content item. Information available to the social networking system can be used to train a model to maximize similarity between related terms, and minimize similarity between unrelated terms. The trained model can be used to determine the relatedness between a comment and the original content item, i.e., the relevance of the comment. Further information may be utilized to analyze user interaction with user comments, and to discount certain interactions based on an interaction-to-impression ratio. The relevance determination and the comment interaction analysis can be used to rank comments for a posted content item.

FIG. 1 illustrates an example system 100 including an example comment ranking module 102 configured to rank comments to a posted content item, according to an embodiment of the present disclosure. The comment ranking module 102 can be configured to rank comments to a posted content item based on the relevance of each comment to the posted content item. The comment ranking module 102 can analyze the content of the posted content item as well as the content of a comment to determine the relevance of the comment to the posted content item.

The comment ranking module 102 may also rank comments to a posted content item based on other factors. Such factors might include a comment interaction analysis, in which a comment can be given a higher ranking if other users have interacted with the comment. For example, other users may be able to "like" a comment, share a comment, or reply to a comment. Interactions with a comment may improve a comment's ranking because they indicate interest by other users in the comment. An interaction-to-impression ratio may also be considered in a comment interaction analysis. For example, a comment having fewer interactions may nonetheless be given a higher ranking than another comment having more interactions if the comment having fewer interactions has a higher an interaction-to-impression ratio. User information may also be considered in ranking comments. For example, comments made by users with a positive history may be given preference over comments made by users who have a history of posting non-sensical, inappropriate, or irrelevant comments.

These aspects and others will be discussed in greater detail herein. By ranking comments based on various factors, such as the comment's relevance, comment interaction information, and user information, as introduced briefly above, a social networking system can optimize the presentation of interesting, relevant comments to users. This can be particularly useful in scenarios where there are a large number of comments and it is impractical for every user to view every comment to a posted content item.

As shown in the example of FIG. 1, the comment ranking module 102 can include a comment relevance determination module 104, a comment interaction analysis module 106, and a user analysis module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The comment relevance determination module 104 can be configured to analyze a posted content item, and a comment to the posted content item, to determine the relevance of the comment to the posted content item. The comment relevance determination module 104 can be configured to train a model (e.g., a machine learning module) to associate terms with other terms, or in other words, to determine how certain terms are related to others. For example, the model can be trained that the term "dog" is related (or more related) to the terms canine, poodle, corgi, man's best friend, chew toy, and that it is not related (or less related) to other terms such as basketball, computer, stapler, etc. The comment relevance determination module 104 can use related term information to analyze a comment and determine how relevant the comment is to a posted content item. A comment having a high relevance to the posted content item may be given a ranking benefit, while a comment having a low relevance to the posted content item may be ranked lower. The comment relevance determination module 104 is discussed in greater detail herein.

The comment interaction analysis module 106 can be configured to analyze user interaction with a comment such that user interaction information can be utilized in ranking the comment. For example, the comment interaction analysis module 106 can increase or decrease a comment's ranking based on the number of other users who have liked, replied to, or shared the comment. The comment interaction analysis module 106 can also be configured to increase or decrease a comment's ranking based on the comment's interaction-to-impression ratio. For example, a comment may be given a ranking benefit despite a relatively low number of impressions if a high number of users who are presented with the comment (i.e., the number of "impressions" for the comment) choose to interact with it in some way. Conversely, a comment's ranking may be decreased despite a relatively high number of impressions if a large proportion of users who are presented with the comment choose not to interact with it in any way, i.e., the ratio of interactions to impressions is relatively low. The comment interaction analysis module 106 is discussed in greater detail herein.

The user analysis module 108 can be configured to analyze user information so that such information can be utilized in the ranking of comments. For example, user history information for a particular user on a social networking system can be utilized in ranking that user's future comments. A user that has a history of posting irrelevant, inappropriate, or otherwise non-sensical comments having no relation to the posted content item may be penalized with a lower comment ranking. Conversely, a user that has a positive history of relevant comments with high interaction-to-impression ratios may be given a ranking boost or benefit. Various aspects of the user analysis module 108 and its interaction with other modules are discussed in greater detail herein.

The comment ranking module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the comment ranking module 102 can be implemented, in part or in whole, as software running on one or more computing devices or systems, such as on a server computing system or a user (or client) computing system. For example, the comment ranking module 102 or at least a portion thereof can be implemented as or within an application (e.g., app), a program, or an applet, etc., running on a user computing device or a client computing system, such as the user device 710 of FIG. 7. In another example, the comment ranking module 102 or at least a portion thereof can be implemented using one or more computing devices or systems that include one or more servers, such as network servers or cloud servers. In some instances, the comment ranking module 102 can, in part or in whole, be implemented within or configured to operate in conjunction with a social networking system (or service), such as the social networking system 730 of FIG. 7. It should be understood that there can be many variations or other possibilities.

The comment ranking module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 730 of FIG. 7). The information associated with the social networking system can include data about users, user identifiers, social connections, social interactions, profile information, demographic information, locations, geo-fenced areas, maps, places, events, pages, groups, posted content items, communications, content, feeds, account settings, privacy settings, a social graph, and various other types of data. In some embodiments, the data store 110 can store information that is utilized by the comment ranking module 102. For instance, the data store 110 can store related term information, user comment histories, comment interaction information, and any other information that may be used to carry out the present technology disclosed herein. It is contemplated that there can be many variations or other possibilities.

Figure 2:
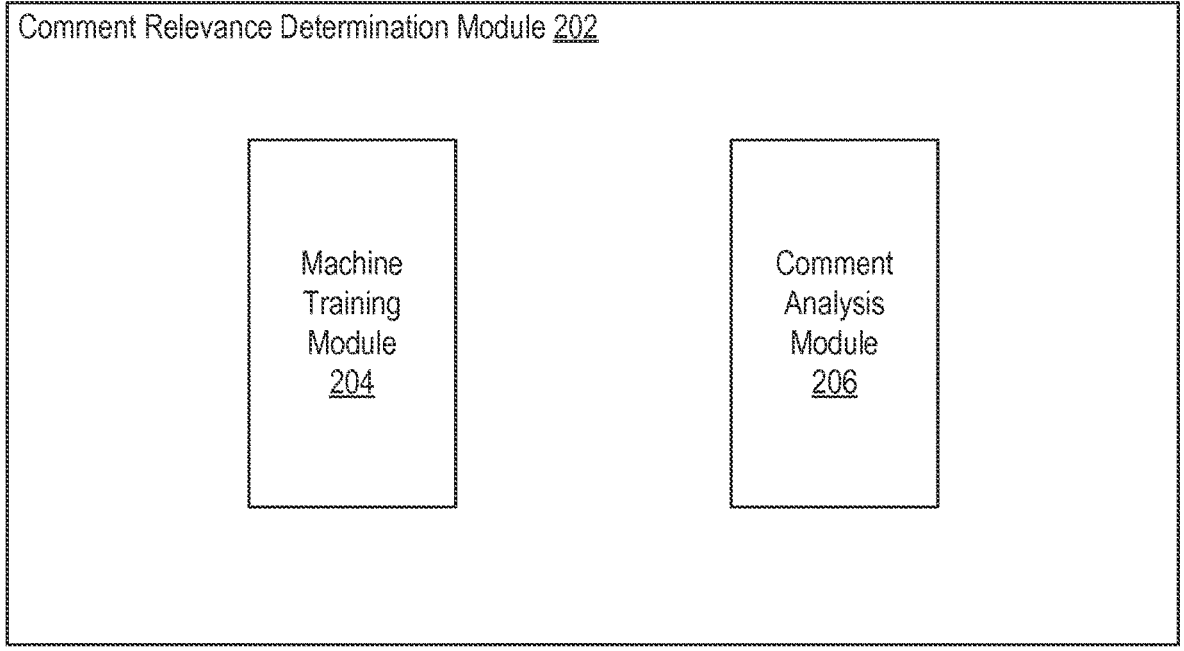
FIG. 2 illustrates an example comment relevance determination module, according to an embodiment of the present disclosure.

FIG. 2 illustrates an example comment relevance determination 202 configured to determine the relevance of a comment to a posted content item, according to an embodiment of the present disclosure. In some embodiments, the comment relevance determination module 104 of FIG. 1 can be implemented as the example comment relevance determination module 202. As shown in FIG. 2, the comment relevance determination module 202 can include a machine training module 204 and a comment analysis module 206.

The machine training module 204 can be configured to train a model to associate certain terms with other terms and to learn how certain terms are related to others. In certain embodiments, the model may be trained using information available to a social networking system. The social networking system may have information available to it that reliably relates various terms to each other, such that the model can learn that certain terms are commonly paired with other related terms. For example, a social networking system may include pages that are devoted to various topics. Creators or managers of a page, such as a page administrator, may include various tags that are descriptive of the content on the page. This may be done to attract users to the page or to allow users to search for various topics and be led to the page. Tags assigned to various pages on the social networking system can be used to inform the model of terms that are commonly grouped together, and are "related" to one another. For example, a social networking system may include multiple pages devoted to dogs. These pages may consistently be tagged with the terms: dog, canine, poodle, corgi, terrier, puppy, etc. By analyzing these pages, the model can be trained to learn that these terms, which consistently show up together, are related to one another. Conversely, the model can learn that certain terms are not related to one another if they never appear together, or if particular terms appear consistently with many unrelated terms (e.g., "the" or "and").

In certain embodiments, in addition to analyzing page tags, the machine training module 204 can also be configured to analyze content items posted to pages to learn the relatedness of various terms. By analyzing a large number of pages, tags, and posted content items, the machine training module 204 can be configured to learn how various terms are related to other terms based on how commonly terms are used together. A relatedness rating can be determined for any two terms based on how commonly those terms appear together. Closely related terms, such as "dog" and "puppy" could have a high relatedness rating, while somewhat related terms, such as "dog" and "toy" can have a lower relatedness rating, and generally unrelated terms, such as "dog" and "stapler" can have an even lower relatedness rating. In certain embodiments, the relatedness rating can be calculated on a sliding scale, e.g., a scale from 0 to 1, with 0 indicating no relationship between the terms whatsoever, and 1 indicating that the terms are never used apart from one another (e.g., if you compare a term with itself). The machine training module 204 can be configured to analyze the relatedness of terms and phrases of various lengths, such as unigrams, bigrams, and trigrams.

The comment analysis module 206 can be configured to utilize the term relatedness information from the machine training module 204 to analyze how relevant a comment is to a posted content item and to determine a relevance rating. Terms in the posted content item can be analyzed and compared to terms in the comment to determine how related the terms in the posted content item are to the terms used in the comment. If the terms in the comment are closely related to the terms in the posted content item, it can be determined that the comment is likely relevant to the content item and a high relevance rating can be assigned, whereas if the terms used in the comment have no relation at all to the terms in the posted content item, then it is likely that the comment is not addressing the posted content item in a relevant or meaningful way and the relevance rating will be low.

In certain embodiments, an n-dimensional space can be defined based on the model trained by the machine training module 204. Any piece of text, such as the text in a posted content item or in a comment, can be mapped on the n-dimensional space based on the terms used in the text. In this way, a particular piece of text can be translated into a point, or a vector, in the n-dimensional space. The relevance of one piece of text (e.g., a comment) to another piece of text (e.g., a posted content item) can be determined by calculating a similarity, such as a cosine similarity, between the vectors associated with the two pieces of text. The cosine similarity can then be used as a relevance rating, indicative of how relevant one piece of text is to another based on the relatedness of the terms used in the two pieces of text.

In various embodiments, a relevance rating can be for comments of non-text posted content items, such as images, videos, and audio. A non-text posted content item can be analyzed for content. The non-text posted content item can be associated with one or more terms based on the content analysis, so that the relevance of a comment can be determined with respect to the associated terms. Association of text terms to a non-text posted content item may be carried out automatically. For example, image analysis can be used to recognize items within an image, and terms associated with the recognized items can be associated with the image. Speech analysis can be used to recognize words in an audio file, and those words can be associated with the non-text posted content item for comparison with comments.

The ranking of a comment can be determined based on the relevance rating calculated for that comment. Ranking a comment based on a relevance rating may be carried out in a variety of ways. For example, in one embodiment, a comment rating may be calculated for each comment on a posted content item. This comment rating may be based on a variety of comment rating criteria, including a relevance rating for a comment. The relevance rating can increase a comment's comment rating if a comment's relevance rating is above a lower relevance rating threshold. Conversely, if a comment's relevance rating is below the lower relevance rating threshold, the relevance rating may have no effect or a negative effect on the comment's comment rating.

In certain embodiments, the relevance rating can positively affect a comment's ranking (or comment rating) by being credited as positive interactions for the comment. As discussed in greater detail herein, comments may be ranked based on user interactions with the comment, with a greater number of user interactions being indicative of greater user interest and boosting a comment's ranking. A positive relevance rating may benefit a comment's ranking by being credited as positive interactions with the comment. For example, a relevance rating of 0.5 may be credited as 10 positive interactions with the comment, and a higher relevant rating of 0.7 may be credited as 25 positive interactions with the comment.

In certain embodiments, it may actually be the case that a relevance rating (e.g., a cosine similarity) that is too high can be indicative of an attempt to manipulate the relevance rating. For example, copying the text of a posted content item into a comment could lead to an artificially high relevance rating. As such, an upper relevance rating threshold may be implemented, such that a relevance rating above the upper relevance rating may result in no benefit conferred by the relevance rating, or even a penalty.

Figure 3:
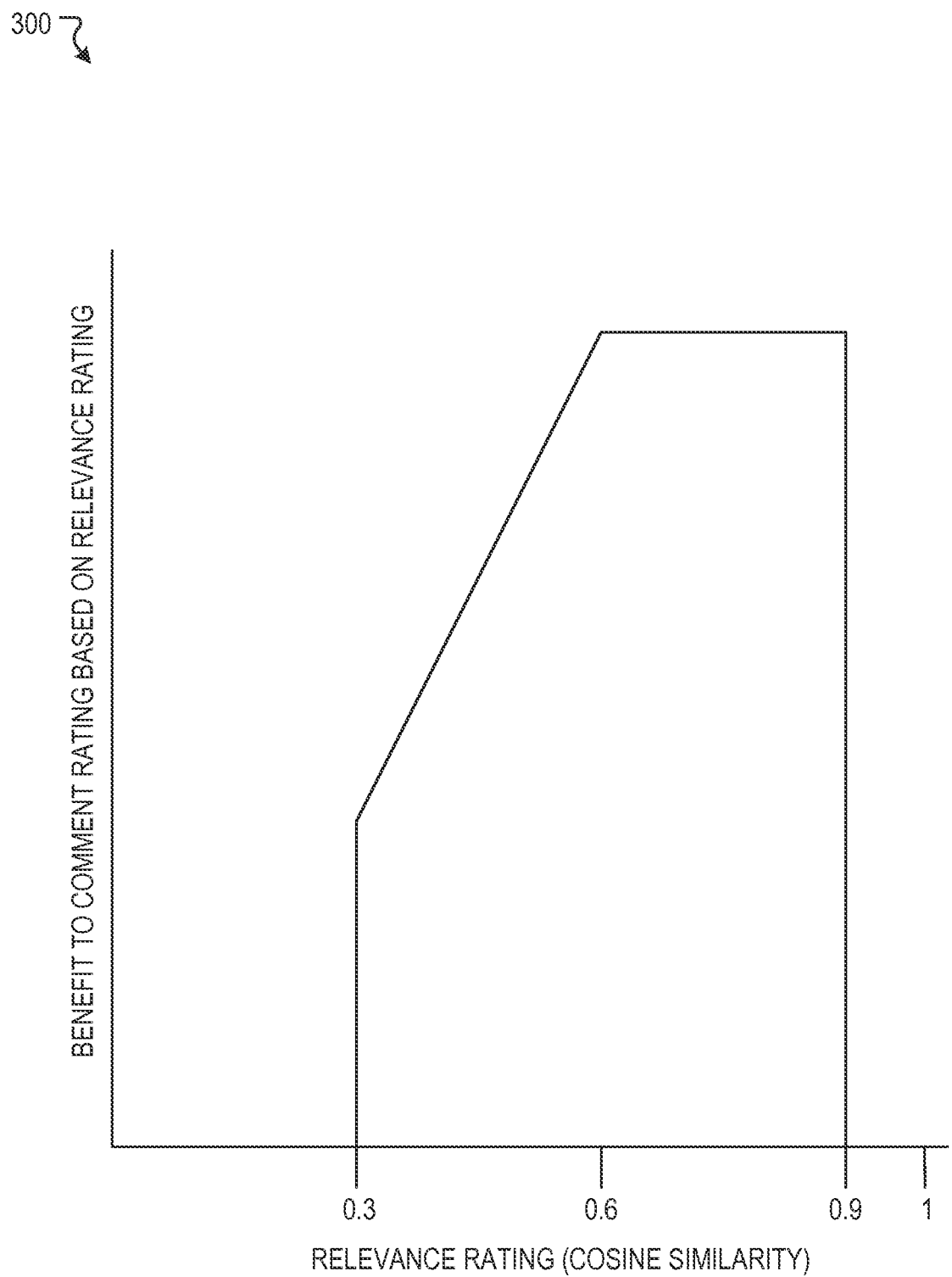
FIG. 3 illustrates an example scenario, including a graphical representation of an example relationship between cosine similarity and comment rating, according to an embodiment of the present disclosure.

FIG. 3 illustrates example scenario 300, including a graphical representation of the relationship between a comment's relevance rating on the x-axis, which is a cosine similarity in this example, and the benefit to the comment's comment rating on the y-axis. It can be seen that below a lower relevance rating threshold of 0.3, no benefit is conferred to the comment's comment rating. From a relevance rating of 0.3 to 0.6, the comment is given a gradually increasing boost to its comment rating, which flattens out between a relevance rating of 0.6 and 0.9. An upper relevance rating threshold of 0.9 is depicted in the example scenario 300. If a comment has a relevance rating above 0.9, then no benefit is conferred to the comment's comment rating based on the comment's relevance rating. Other relationships between a comment's relevance and the benefit to a comment's comment rating can be used.

In addition to the relevance rating, a comment's ranking or comment rating may also be affected by various other comment rating criteria. Other examples of comment rating criteria may include the volume and frequency of interaction with a comment; grammatical quality of the comment; a user's comment history; a user's status as a verified or trustworthy user; whether other users have marked the comment as irrelevant or inappropriate; and the like.

Figure 4:
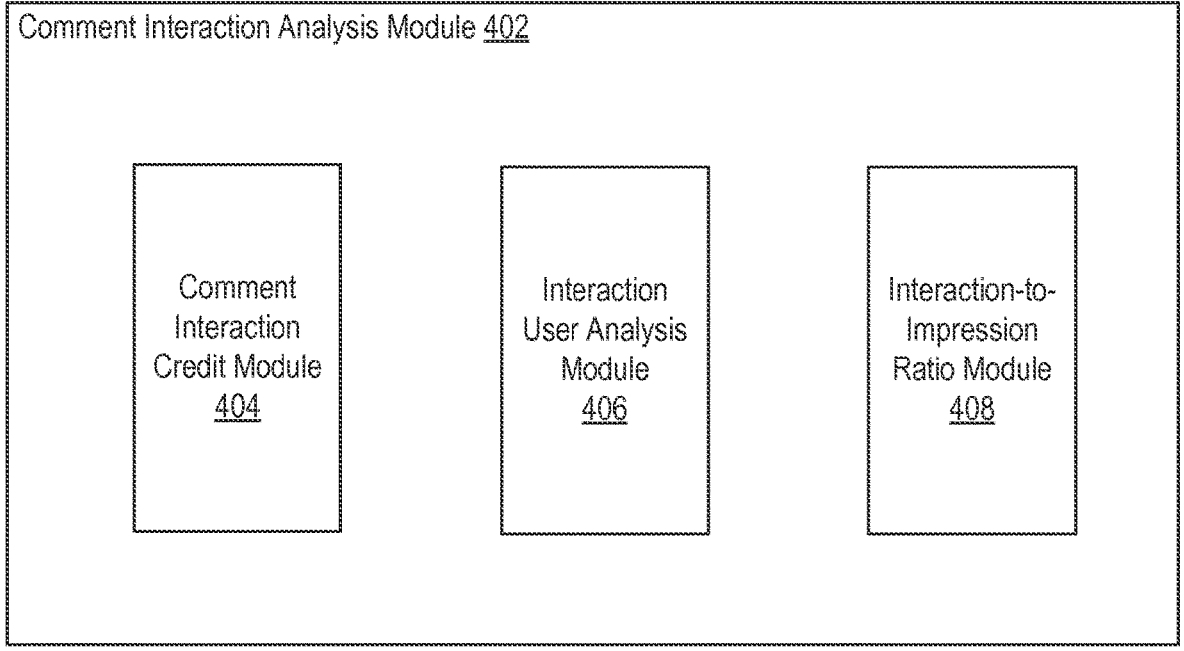
FIG. 4 illustrates an example comment interaction analysis module, according to an embodiment of the present disclosure.

FIG. 4 illustrates an example comment interaction analysis module 402 configured to analyze comment interaction information for a comment to be utilized in ranking the comment, in accordance with an embodiment of the present disclosure. In some embodiments, the comment interaction analysis module 106 of FIG. 1 may be implemented as the example comment interaction analysis module 402. As shown in FIG. 4, the comment interaction analysis module 402 can include a comment interaction credit module 404, an interaction user analysis module 406, and an interaction-to-impression ratio module 408. In certain embodiments, the comment interaction analysis module 402 can be configured to affect a comment's ranking based on comment interaction information. For example, the comment interaction analysis module 402 can be configured to calculate an interaction rating for each comment which is utilized in ranking each comment. In certain embodiments, the comment interaction analysis module 402 can be configured to increase or decrease a comment's ranking or a comment's comment rating based on comment interaction information.

The comment interaction credit module 404 can be configured to analyze interaction with a comment for interaction information to be used in ranking the comment. As discussed above, users may be given the opportunity to interact with a comment. For example, users can "like" a comment, share the comment, or reply to the comment. Such interaction with a comment may be indicative of general user interest in the comment, and the comment can be ranked higher based on this indication of interest from other users. Positive interaction with a comment can result in an improved ranking for a comment. For example, a comment's comment rating can be increased based on the amount of positive interaction received. In certain embodiments, users may also be given the ability to report a comment as irrelevant or inappropriate. Such negative reports may decrease a comment's ranking. For example, if the comment receives above a threshold number of negative reports from users, i.e., a negative report threshold, the comment's ranking or the comment's comment rating may be decreased, or the comment may be removed altogether.

The interaction user analysis module 406 can be configured to analyze user information for a user interacting with a comment. This user information can be used to potentially increase or decrease the effect of the user's interaction with the comment. Similar to the user analysis module 108 of FIG. 1, characteristics of a user interacting with a comment can affect the weight the user's interaction is given in ranking the comment. For example, positive interaction by a user that has a history of improper behavior may be given less weight, such that that user's interaction has less overall impact on the comment's ranking, or the user's interaction may be ignored altogether. Conversely, interactions by users that have a history of positive, reliable behavior may be given greater weight. Similarly, interactions by the original poster of the posted content item may be given greater weight.

The interaction-to-impression ratio module 408 can be configured to affect a comment's comment rating or interaction rating, or both, based on an interaction-to-impression ratio. Although the number of interactions with a comment may be useful in determining a comment's interest to other users, it may be misleading in certain instances. For example, a comment may have a relatively high number of interactions, but that may be due to the fact that the comment has been presented to a large number of users, i.e., has a large number of impressions. Comments that are ranked highly early on may have a tendency to continue to be ranked highly because those highly ranked comments will continue to be shown to a large number of users, and have greater opportunity for interaction. However, this large number of interactions may not accurately portray how interesting the comment is to other users. For example, if the comment has 400 interactions, but 100,000 impressions, that means that the vast majority of users have seen the comment but chosen not to interact with it. Meanwhile, if another comment has only 40 interactions, but those 40 interactions have come from only 45 impressions, the second comment may arguably be more interesting to other users, given that a very large proportion of users that have been presented with the comment have chosen to interact with it.

To account for impressions, an interaction-to-impression ratio may be utilized to calculate how frequently users are choosing to interact with a comment when it is presented to them. A comment's interaction rating may be increased or decreased based on the comment's interaction-to-impression ratio. In certain embodiments, a comment's interaction-to-impression ratio may be used only to discount the comment's interaction rating, with a higher ratio resulting in a little to no decrease in the interaction rating, and a lower ratio resulting in a greater decrease. In certain embodiments, a comment's interaction rating may be increased based on a relatively high interaction-to-impression ratio. In this scenario, an interaction-to-impression ratio above an upper ratio threshold may result in an increase in ranking, while an interaction-to-impression ratio below a lower ratio threshold may result in a decrease in ranking.

Interaction-to-impression ratios may be affected by small sample size issues. Specifically, interaction-to-impression ratios may be less reliable for smaller sample sizes, and more reliable for larger sample sizes. For example, the following scenarios each have the same interaction-to-impression ratio of 0.4: scenario A—4 interactions to 10 impressions; scenario B—40 interactions to 100 impressions; and scenario C—400 interactions to 1000 impressions. However, scenario C's calculated interaction-to-impression ratio is more reliable than that of scenarios A or B, because of the smaller sample sizes of those scenarios. In other words, as users continue to interact with the comments in each of the scenarios, it is more likely that the comment in scenario C will continue to have an interaction-to-impression ratio close to 0.4 because of the relatively large 1000 user sample size. Conversely, it is less likely that the comment in scenario A will continue to keep an interaction-to-impression ratio close to 0.4, as each individual user that sees and interacts with the comment will drastically affect the interaction-to-impression ratio with such a small sample size. Sample size issues may be taken into account by determining a comment's effective interaction-to-impression ratio based on a proportion confidence interval, e.g., a binomial proportion confidence interval or a Wilson confidence interval.

Figure 5:
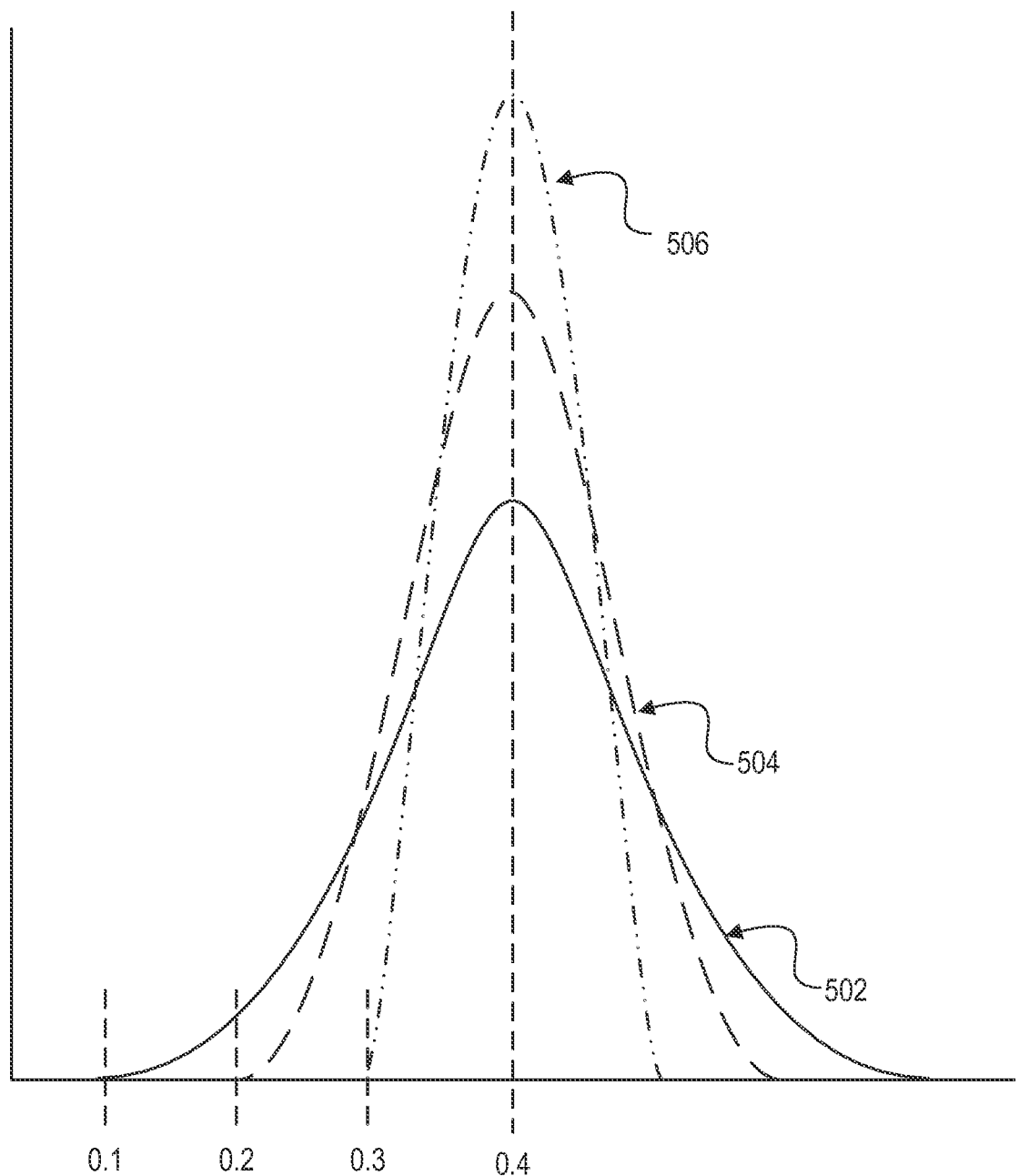
FIG. 5 illustrates an example scenario, including confidence interval curves for interaction-to-impression ratios, according to an embodiment of the present disclosure.

FIG. 5 illustrates an example scenario 500 with three different proportion confidence interval curves 502, 504, and 506. Each proportion confidence interval curve is associated with a data set, and each curve represents a probability curve for the associated data set's interaction-to-impression ratio, with probability on the y-axis and interaction-to-impression ratio on the x-axis. Each of the proportion confidence interval curves has an actual interaction-to-impression ratio of 0.4, but curve 506 has a larger sample size than curve 504, which has a larger sample size than curve 502. Therefore, the interaction-to-impression ratio of curve 506 is more reliable, and the curve is tighter to the actual interaction-to-impression ratio of 0.4. In order to account for the sample size discrepancy, and the greater likelihood that curve 506 represents a data set with an interaction-to-impression ratio close to 0.4 than curve 502, a comment's effective interaction-to-impression ratio may be calculated based on the proportion confidence interval curve. For example the effective interaction-to-impression ratio can be calculated based on a lower curve threshold. In FIG. 5, the effective interaction-to-impression ratio for curve 502 is demonstrated where the curve 502 intersects the x-axis, resulting in an effective interaction-to-impression ratio of 0.1. Similarly, the effective interaction-to-impression ratio for curve 504 is 0.2, and for curve 506 it is 0.3. It can be seen that this implementation accounts for sample size issues by assigning a comment with a larger sample size an effective interaction-to-impression ratio that is closer to the actual interaction-to-impression ratio than a comment with a smaller sample size. The effective interaction-to-impression ratio can be utilized to increase or decrease a comment's interaction rating, comment rating, comment ranking, or any combination of the above.

It should be understood that although various portions of the present disclosure discuss increasing or decreasing a particular value, e.g., a comment ranking, a comment rating, an interaction rating, a relevance rating, etc., it should be understood that these actions may be taken in various ways without departing from the present disclosure. For example, where the present disclosure makes reference to increasing or decreasing a comment ranking, this may comprise increasing or decreasing the comment's comment rating. Furthermore, increase or decreasing a comment ranking may comprise increasing or decreasing a comment rating, without actually changing the comment ranking. For example, a comment's comment rating may drop, but the comment may still remain in the same ranking relative to other comments. In another example, the present disclosure may make reference to increasing or decreasing a relevance rating or an interaction rating. However, in various embodiments, a discrete relevance rating or interaction rating may not be calculated on its own, but relevance information or interaction information may be utilized in determining a comment's ranking or comment rating. It should be understood that even if a discrete relevance rating or interaction rating are not explicitly calculated, a comment's ranking or comment rating can be increased or decreased based on a relevance determination or based on comment interaction information. As such, the disclosure provided herein should be interpreted broadly, and not limited to the specific examples and embodiments discussed herein.

Figure 6A:
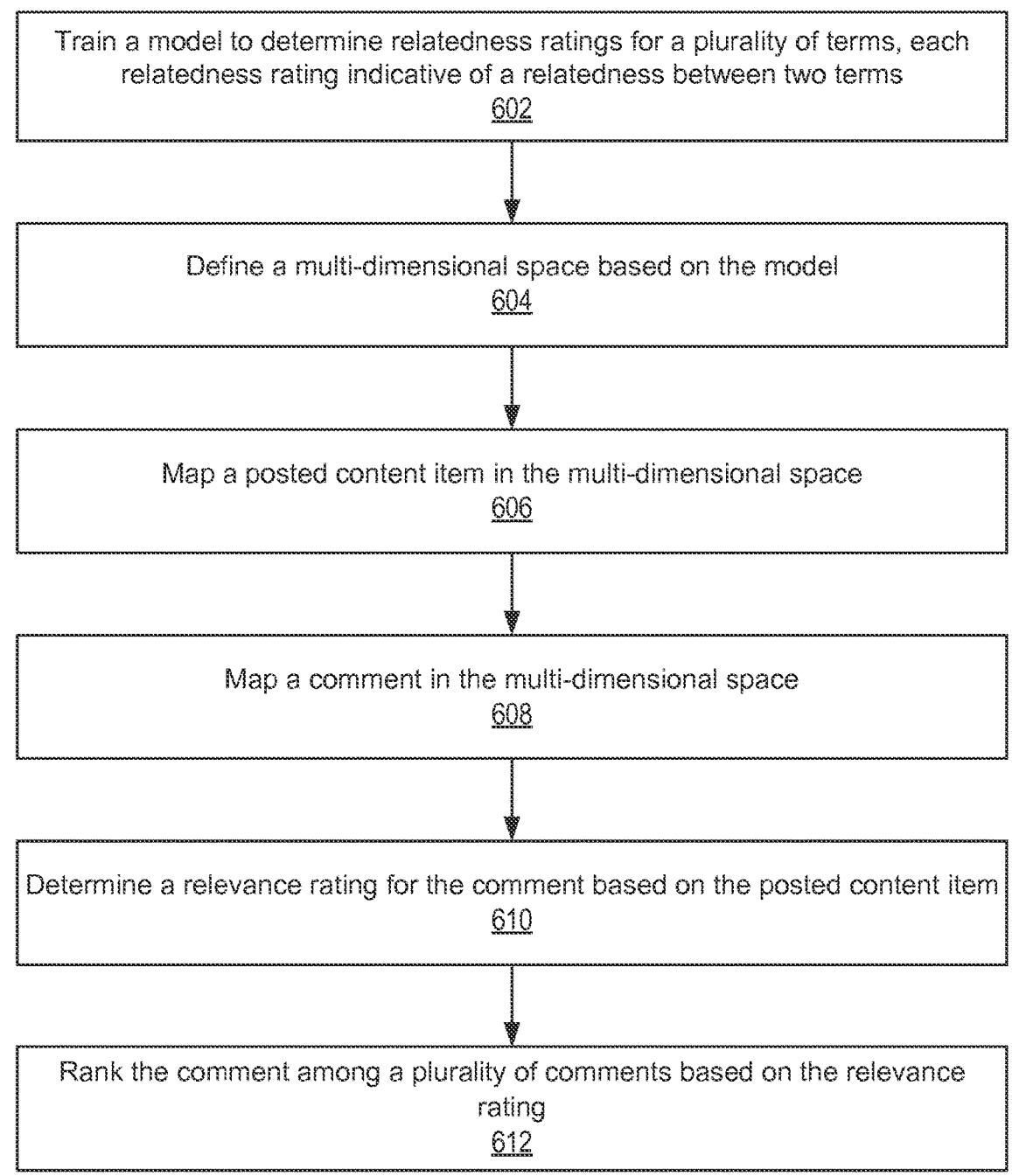
FIG. 6A illustrates an example method to rank comments, according to an embodiment of the present disclosure.

FIG. 6A illustrates an example method 600 associated with ranking comments, according to an embodiment of the present disclosure. It should be appreciated that there can be additional, fewer, or alternative steps performed in similar or alternative orders, or in parallel, based on the various features and embodiments discussed herein unless otherwise stated.

At block 602, the example method 600 can train a model to determine relatedness ratings for a plurality of terms, each relatedness rating indicative of a relatedness between two terms. At block 604, the example method 600 can define a multi-dimensional space based on the model. At block 606, the example method 600 can map a posted content item in the multi-dimensional space. At block 608, the example method 600 can map a comment in the multi-dimensional space. At block 610, the example method 600 can determine a relevance rating for the comment based on the posted content item. At block 612, the example method 600 can rank the comment among a plurality of comments based on the relevance rating.

Figure 6B:
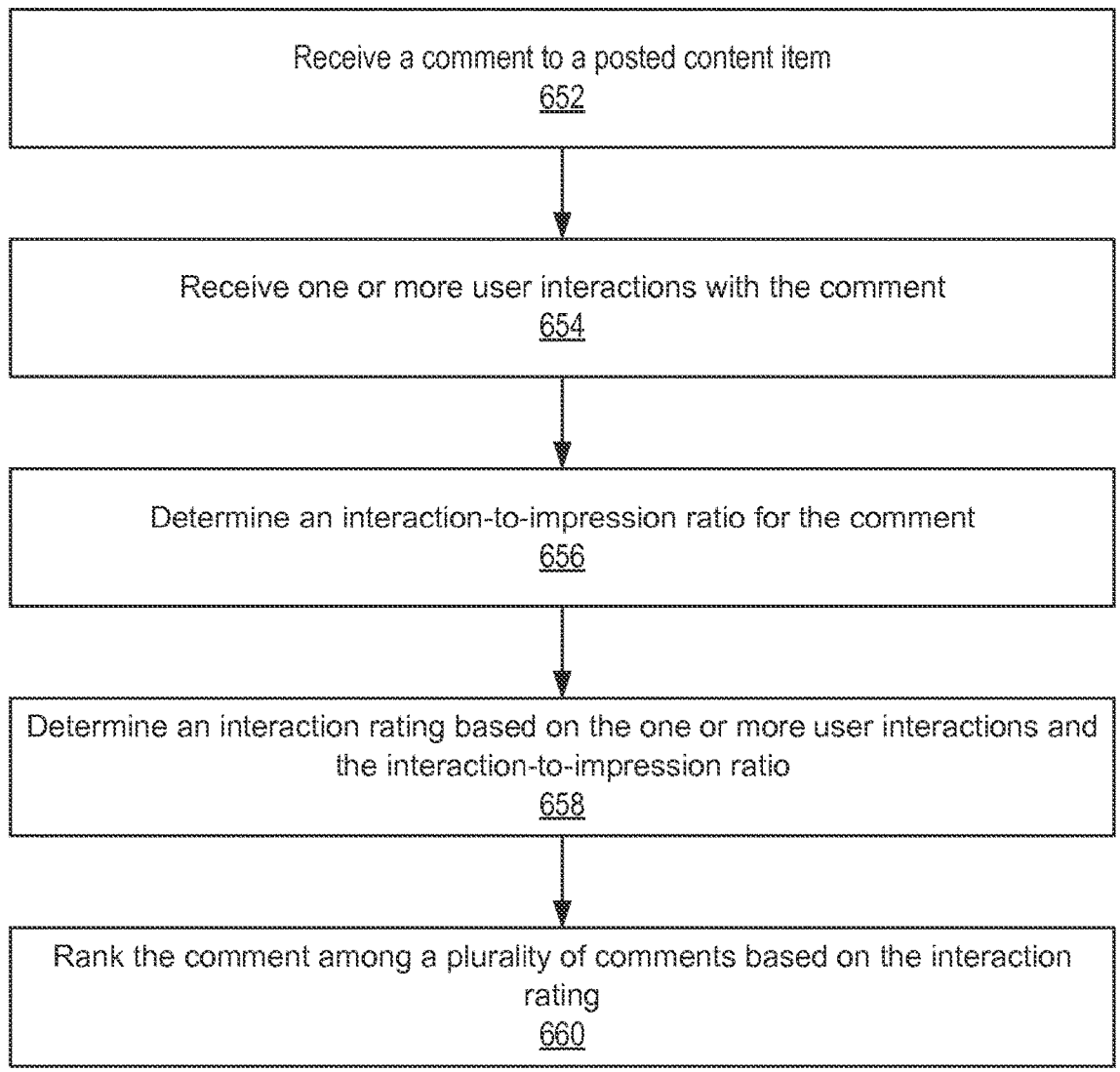
FIG. 6B illustrates an example method to determine a comment ranking based on an interaction-to-impression ratio, according to an embodiment of the present disclosure.

FIG. 6B illustrates an example method 650 associated with ranking a comment based on an interaction-to-impression ratio, according to an embodiment of the present disclosure. It should be appreciated that there can be additional, fewer, or alternative steps performed in similar or alternative orders, or in parallel, based on the various features and embodiments discussed herein unless otherwise stated.

At block 652, the example method 650 can receive a comment to a posted content item. At block 654, the example method 650 can receive one or more user interactions with the comment. At block 656, the example method 650 can determine an interaction-to-impression ratio for the comment. At block 658, the example method 650 can determine an interaction rating based on the one or more user interactions and the interaction-to-impression ratio. At block 660, the example method 650 can rank the comment among a plurality of comments based on the interaction rating.

Social Networking System—Example Implementation

Figure 7:
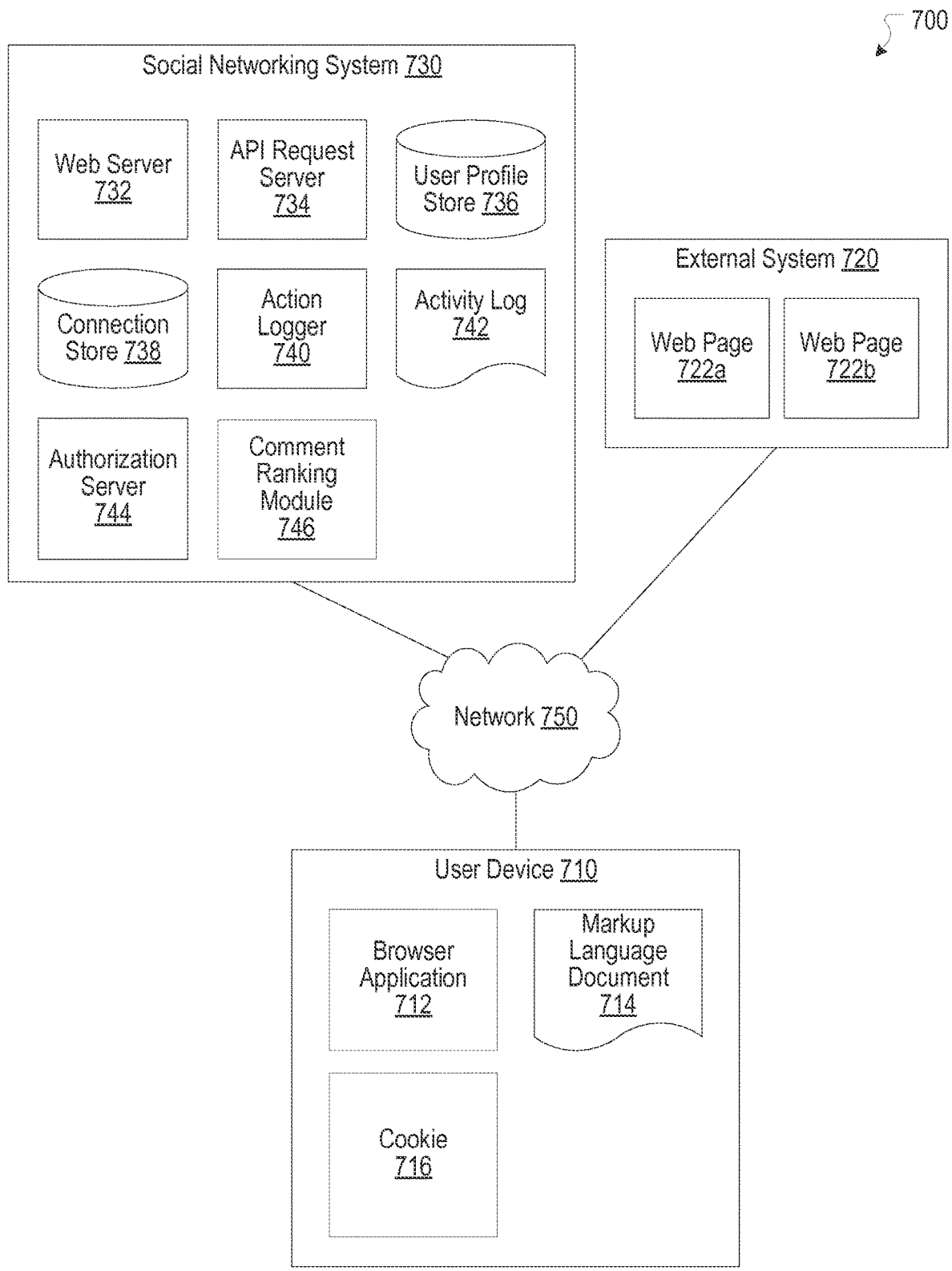
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user may be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes"

another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This can occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a comment ranking module 746. The comment ranking module 746 can, for example, be implemented as the comment ranking module 102 of FIG. 1. As discussed previously, it should be appreciated that there can be many variations or other possibilities. For example, in some instances, the comment ranking module 746 (or at least a portion thereof) can be included or implemented in the user device 710. Other features of the comment ranking module 746 are discussed herein in connection with the comment ranking module 102.

Hardware Implementation

Figure 8:
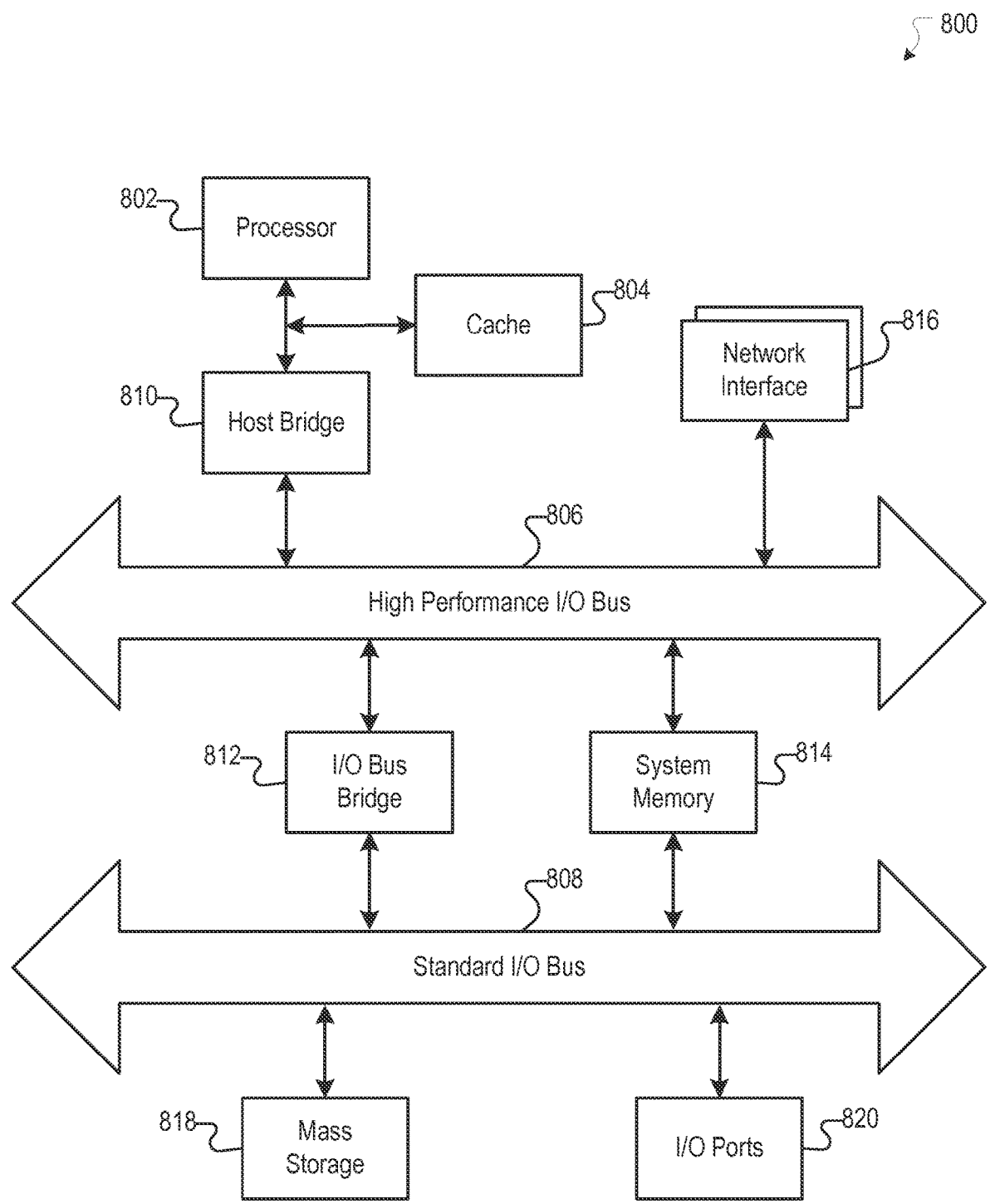
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   training, by a computing system, a model to define relatedness ratings for a plurality of terms, each relatedness rating indicative of a relatedness between two terms;
   receiving, by the computing system, a posted content item;
   receiving, by the computing system, a comment posted by a user to the posted content item;
   determining, by the computing system, a relevance rating for the comment and the posted content item based on the model; and
   ranking, by the computing system, the comment among a plurality of comments based on the relevance rating and further based on comment interaction information indicative of interaction with the comment by users of a social networking system, wherein
   ranking the comment among the plurality of comments based on the comment interaction information comprises ranking the comment among the plurality of comments based on an interaction-to-impression ratio associated with the comment and user information associated with the users, wherein the interaction-to-impression ratio is determined based in part on a user sample size and the user information comprises posting history associated with the users.

2. The computer-implemented method of claim 1, further comprising defining a multi-dimensional space based on the model.

3. The computer-implemented method of claim 2, further comprising mapping the posted content item and the comment in the multi-dimensional space.

4. The computer-implemented method of claim 3, wherein determining a relevance rating for the comment and the posted content item comprises calculating a cosine similarity between the posted content item and the comment in the multi-dimensional space.

5. The computer-implemented method of claim 1, wherein training the model to define relatedness ratings for a plurality of terms comprises analyzing a plurality of pages on a social networking system for related terms.

6. The computer-implemented method of claim 1, wherein ranking the comment among a plurality of comments based on the relevance rating comprises determining whether the relevance rating satisfies a lower relevance rating threshold.

7. The computer-implemented method of claim 1, wherein ranking the comment among a plurality of comments based on the relevance rating comprises determining whether the relevance rating satisfies an upper relevance rating threshold.

8. The computer-implemented method of claim 7, wherein no ranking benefit is conferred by the relevance rating if the relevance rating exceeds the upper relevance rating threshold.

9. The computer-implemented method of claim 1, wherein ranking the comment among a plurality of comments based on the relevance rating comprises crediting an interaction rating based on the relevance rating.

10. The computer-implemented method of claim 1, wherein receiving a posted content item comprises analyzing a non-text posted content item and associating one or more terms with the non-text posted content item.

11. A system comprising:
    at least one processor; and
    a memory storing instructions that, when executed by the at least one processor, cause the system to perform:
    training a model to define relatedness ratings for a plurality of terms, each relatedness rating indicative of a relatedness between two terms;
    receiving a posted content item;
    receiving a comment posted by a user to the posted content item;
    determining a relevance rating for the comment and the posted content item based on the model; and ranking the comment among a plurality of comments based on the relevance rating and further based on comment interaction information indicative of interaction with the comment by users of a social networking system, wherein
    ranking the comment among the plurality of comments based on the comment interaction information comprises ranking the comment among the plurality of comments based on an interaction-to-impression ratio associated with the comment and user information associated with the users, wherein the interaction-to-impression ratio is determined based in part on a user sample size and the user information comprises posting history associated with the users.

12. The system of claim 11, wherein the method further comprises defining a multi-dimensional space based on the model.

13. The system of claim 12, wherein the method further comprises mapping the posted content item and the comment in the multi-dimensional space.

14. The system of claim 13, wherein determining a relevance rating for the comment and the posted content item comprises calculating a cosine similarity between the posted content item and the comment in the multi-dimensional space.

15. The system of claim 11, wherein training the model to define relatedness ratings for a plurality of terms comprises analyzing a plurality of pages on a social networking system for related terms.

16. A non-transitory computer-readable storage medium including instructions that, when executed by at least one processor of a computing system, cause the computing system to perform a method comprising:
    training a model to define relatedness ratings for a plurality of terms, each relatedness rating indicative of a relatedness between two terms;
    receiving a posted content item;
    receiving a comment by a user to the posted content item;
    determining a relevance rating for the comment and the posted content item based on the model; and
    ranking the comment among a plurality of comments based on the relevance rating and further based on comment interaction information indicative of interaction with the comment by users of a social networking system, wherein
        ranking the comment among the plurality of comments based on the comment interaction information comprises ranking the comment among the plurality of comments based on an interaction-to-impression ratio associated with the comment and user information associated with the users, wherein the interaction-to-impression ratio is determined based in part on a user sample size and the user information comprises posting history associated with the users.

17. The non-transitory computer-readable storage medium of claim 16, wherein the method further comprises defining a multi-dimensional space based on the model.

18. The non-transitory computer-readable storage medium of claim 17, wherein the method further comprises mapping the posted content item and the comment in the multi-dimensional space.

19. The non-transitory computer-readable storage medium of claim 18, wherein determining a relevance rating for the comment and the posted content item comprises calculating a cosine similarity between the posted content item and the comment in the multi-dimensional space.

20. The non-transitory computer-readable storage medium of claim 16, wherein training the model to define relatedness ratings for a plurality of terms comprises analyzing a plurality of pages on a social networking system for related terms.

* * * * *